US012681237B2

(12) United States Patent
Morishima

(10) Patent No.: US 12,681,237 B2
(45) Date of Patent: Jul. 14, 2026

(54) OPTICAL CONNECTOR AND OPTICAL CONNECTION STRUCTURE

(71) Applicant: SUMITOMO ELECTRIC INDUSTRIES, LTD., Osaka (JP)

(72) Inventor: Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 377 days.

(21) Appl. No.: 18/038,263

(22) PCT Filed: Dec. 10, 2021

(86) PCT No.: PCT/JP2021/045658
§ 371 (c)(1),
(2) Date: May 23, 2023

(87) PCT Pub. No.: WO2022/131169
PCT Pub. Date: Jun. 23, 2022

(65) Prior Publication Data
US 2023/0417995 A1     Dec. 28, 2023

(30) Foreign Application Priority Data

Dec. 18, 2020     (JP) ................................. 2020-210490

(51) Int. Cl.
*G02B 6/255* (2006.01)
(52) U.S. Cl.
CPC .................................. *G02B 6/2555* (2013.01)
(58) Field of Classification Search
CPC ..... G02B 6/255; G02B 6/2553; G02B 6/2555
See application file for complete search history.

(56) References Cited

U.S. PATENT DOCUMENTS

| | | | |
|---|---|---|---|
| 4,818,061 A | 4/1989 | Iwano et al. | |
| 5,129,024 A | 7/1992 | Honma | |
| (Continued) | | | |

FOREIGN PATENT DOCUMENTS

| | | | |
|---|---|---|---|
| JP | S61-252510 A | 11/1986 | |
| JP | H04-102809 A | 4/1992 | |
| (Continued) | | | |

OTHER PUBLICATIONS

Nagase et al., "MU-type multicore fiber connector", Proceedings of the 61st IWCS Conference, 2012, pp. 823-827.

*Primary Examiner* — Tina Wong
(74) *Attorney, Agent, or Firm* — OLIFF PLC

(57) ABSTRACT

An optical connector includes an optical fiber that includes a glass fiber and a resin coating portion, a ferrule that includes a ferrule main body holding the glass fiber and a flange portion fixed to the ferrule main body, a housing that accommodates the ferrule and includes an inner wall surface facing the ferrule, and an elastic member that is accommodated in the housing and applies an elastic force to the ferrule in a longitudinal direction of the housing. The housing is configured to have a space between the inner wall surface and the flange portion, and the housing is configured such that at least a part of the housing including the inner wall surface is deformed in a state where the housing is engaged with the adaptor, and the inner wall surface prevents rotation of the flange portion with respect to the housing.

9 Claims, 9 Drawing Sheets

(56)     References Cited

U.S. PATENT DOCUMENTS

| | | | |
|---|---|---|---|
| 9,367,984 B2 * | 6/2016 | Daugbjerg | E05B 65/46 |
| 2006/0159401 A1 | 7/2006 | Lapp et al. | |
| 2013/0277356 A1 * | 10/2013 | Sato | G02B 6/2551 |
| | | | 219/383 |
| 2015/0247977 A1 | 9/2015 | Shimakawa | |
| 2016/0363732 A1 * | 12/2016 | Zimmel | G02B 6/2558 |
| 2018/0267243 A1 * | 9/2018 | Nhep | G02B 6/3889 |
| 2019/0101704 A1 | 4/2019 | Morishima et al. | |
| 2019/0101705 A1 | 4/2019 | Morishima et al. | |
| 2020/0132934 A1 | 4/2020 | Sutherland | |
| 2020/0166715 A1 | 5/2020 | Shimakawa et al. | |
| 2021/0333483 A1 | 10/2021 | Morishima | |

FOREIGN PATENT DOCUMENTS

| | | |
|---|---|---|
| JP | -08-94879 A | 4/1996 |
| JP | 2014-106440 A | 6/2014 |
| JP | 2019-66772 A | 4/2019 |
| WO | 2019/044079 A1 | 3/2019 |
| WO | 2020/149262 A1 | 7/2020 |

* cited by examiner

FIG. 7

OPTICAL CONNECTOR AND OPTICAL CONNECTION STRUCTURE

TECHNICAL FIELD

The present disclosure relates to an optical connector and an optical splice structure. The present application claims priority from Japanese Patent Application No. 2020-210490 filed on Dec. 18, 2020, contents of which are incorporated by reference in its entirety.

BACKGROUND ART

An optical connector includes a ferrule that holds an optical fiber and a housing that accommodates the fermi e. In the optical connector, it is required to maintain an optical splice state of two optical fibers optically spliced to each other even when an impact such as an external force is applied to the housing. In an optical connector that splices optical fibers having a non-axisymmetric cross-sectional structure, such as multi-core optical fibers or polarization maintaining optical fibers, azimuthal positioning of each of the optical fibers around a central axis is required before the two optical fibers are optically spliced to each other via a sleeve.

In this regard, in Non Patent Literature 1, an Oldham coupling mechanism is adopted as a structure that meets these requirements. In the Oldham coupling structure, a coupling component is provided between the ferrule and a flange portion. Accordingly, the ferrule is movable in one direction with respect to the coupling component, and the coupling component is movable in a direction perpendicular to the one direction with respect to the housing, and thus floating of the ferrule with respect to the housing is achieved. Further, the coupling component prevents rotation of the ferrule.

CITATION LIST

Non Patent Literature

Non Patent Literature 1: Ryo Nagase et al, "MU-type multicore fiber connector", Proceedings of the 61st IWCS Conference (2012) 823-827

SUMMARY OF INVENTION

An optical connector of the present disclosure achieves an optical splice by engaging with an adapter. The optical connector includes: an optical fiber that includes a glass fiber including a core and a cladding covering the core, and a resin coating portion covering the glass fiber, an end portion of the glass fiber being exposed from the resin coating portion; a ferrule that includes a ferrule main body holding the glass fiber exposed from the resin coating portion and a flange portion fixed to the ferrule main body; a housing that accommodates the ferrule and includes an inner wall surface facing the ferrule; and an clastic member that is accommodated in the housing and applies an elastic force to the ferrule in a longitudinal direction of the housing. The housing has a space between the inner wall surface and the flange portion. The housing is configured such that at least a part of the housing including the inner wall surface is deformed by engagement between the housing and the adapter, and the inner wall surface prevents rotation of the flange portion with respect to the housing.

An optical splice structure according to the present disclosure includes: the optical connector according to the present disclosure; an optical component that faces the optical connector and is optically spliced to the optical connector; a sleeve that optically splices the optical fiber of the optical connector and an optical fiber of the optical component; and the adapter that engages with the optical connector and the optical component.

BRIEF DESCRIPTION OF DRAWINGS

FIG. 7 is a view showing a state in which two optical connectors optically spliced to each other are engaged with the adapter.

DESCRIPTION OF EMBODIMENTS

Figure 1:
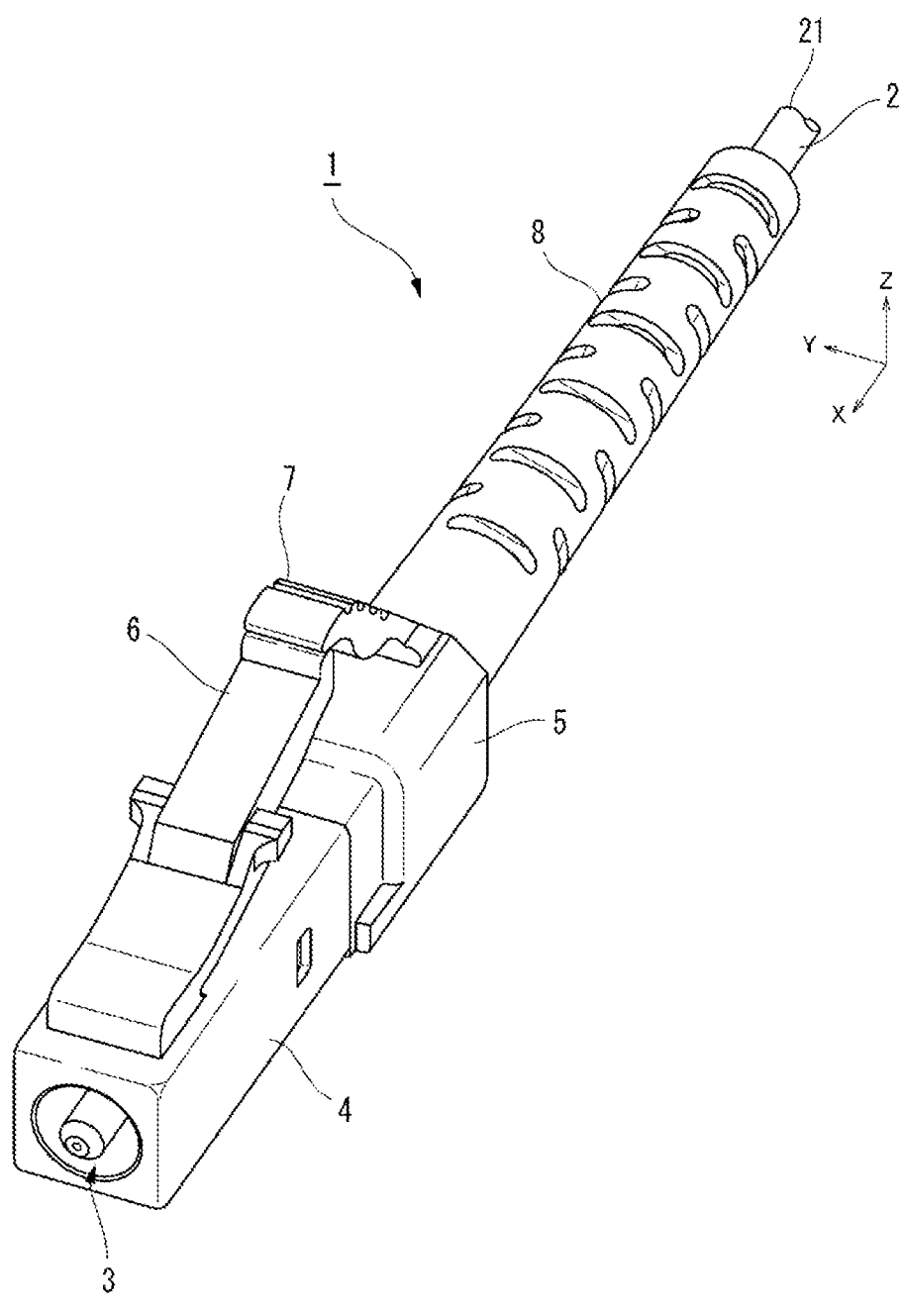
FIG. 1 is a perspective view showing an optical connector according to an embodiment (hereinafter, referred to as the present embodiment) of the present disclosure.

Problems to be Solved by Present Disclosure

The Oldham coupling structure disclosed in Non Patent Literature 1 has a relatively complicated structure. The number of components of the optical connector is increased in the case of the Oldham coupling structure. Accordingly, there is room for studying an optical connector having a new structure for solving such a problem.

DESCRIPTION OF EMBODIMENTS

An outline of an embodiment will be described.

(1) An optical connector according to the present disclosure is an optical connector that achieves an optical splice by engaging with an adapter. The optical connector includes: an optical fiber that includes a glass fiber including a core and a cladding covering the core, and a resin coating portion covering the glass fiber, an end portion of the glass fiber being exposed from the resin coating portion; a ferrule that includes a ferrule main body holding the glass fiber exposed from the resin coating portion and a flange portion fixed to the ferrule main body; a housing that accommodates the ferrule and includes an inner wall surface facing the ferrule; and an elastic member that is accommodated in the housing and applies an elastic force to the ferrule in a longitudinal direction of the housing, the housing has a space between the inner wall surface and the flange portion, and the housing is configured such that at least a part of the housing including the inner wall surface is deformed by engagement between the housing and the adapter, and the inner wall surface prevents rotation of the flange portion with respect to the housing.

According to the above aspect, it is possible to provide the optical connector capable of achieving azimuthal positioning of the ferrule around a central axis with respect to the housing by a relatively simple structure without increasing the number of components of the optical connector.

Since it is not necessary to process the housing with strict accuracy, a manufacturing cost of the optical connector can be reduced. Further, when the ferrule is inserted into the housing, the inner wall surface of the housing can be suitably prevented from being damaged by the flange portion.

(2) The optical connector according to the present disclosure may further include a latch fixed to the housing, and the latch may be configured to deform in a direction intersecting the longitudinal direction when the housing engages with the adapter, and to deform at least a part of the housing.

According to the above configuration, it is possible to achieve the azimuthal positioning of the ferrule around the central axis with respect to the housing by the relatively simple structure without increasing the number of components of the optical connector.

(3) In the optical connector according to the present disclosure, the flange portion may include a flat surface facing the inner wall surface, and the flat surface may be configured to contact the inner wall surface to prevent the rotation of the flange portion with respect to the housing.

According to the above configuration, it is possible to reliably achieve the azimuthal positioning of the ferrule around the central axis with respect to the housing through surface contact between the inner wall surface of the housing and the flat surface of the flange portion.

(4) in the optical connector according to the present disclosure, the inner wall surface may include a first inner wall surface and a second inner wall surface facing each other via the ferrule in a direction orthogonal to the longitudinal direction, the flange portion may include a first surface facing the first inner wall surface, and a second surface located opposite to the first surface and facing the second inner wall surface, and the first inner wall surface, the second inner wall surface, the first surface, and the second surface may be configured to prevent the rotation of the flange portion with respect to the housing by contact between the first inner wall surface and the first surface and contact between the second inner wall surface and the second surface.

According to the above configuration, it is possible to reliably achieve the azimuthal positioning of the ferrule around the central axis with respect to the housing through the surface contact between the first inner wall surface of the housing and the first surface of the flange portion and the surface contact between the second inner wall surface of the housing and the second surface of the flange portion.

(5) In the optical connector according to the present disclosure, when the optical fiber is optically spliced to an optical component, the ferrule may move in the longitudinal direction against the elastic force from the elastic member, the prevention of the rotation of the flange portion by the inner wall surface may be released, and the ferrule may be in a floating state with respect to the housing.

According to the above configuration, when the optical fiber is optically spliced to the optical component (for example, another optical connector accommodated in the adapter), the prevention of the rotation of the flange portion by the inner wall surface of the housing is released, and the ferrule is in the floating state with respect to the housing. As described above, even when the housing receives an impact from an outside, it is possible to suitably prevent an optical splice between the optical fiber and the optical component from being adversely affected.

(6) In the optical connector according to the present disclosure, the optical fiber may be a multi-core fiber, a polarization maintaining fiber, or a bundle fiber.

In the case in which the optical fiber is the multi-core fiber, the polarization maintaining fiber, or the bundle fiber, when the optical fiber is optically spliced to the optical component such as another optical connector, it is necessary to position the azimuth of the optical fiber around the central axis. On the other hand, according to the present embodiment, since the inner wall surface of the housing prevents the rotation of the flange portion with respect to the housing, it is possible to achieve the azimuthal positioning of the optical fiber around the central axis by the relatively simple structure without increasing the number of components of the optical connector.

(7) In the optical connector according to the present disclosure, the housing may be made of a resin material.

In this case, since the housing is made of the resin material, at least a part of the housing is easily deformed when the housing is accommodated in the adapter.

(8) In the optical connector according to the present disclosure, the flange portion may be made of a metal material.

In this case, since the flange portion is made of the metal material, the inner wall surface of the housing can reliably restrict the rotation of the flange portion with respect to the housing, (9) Alternatively, the flange portion may be made of a resin material.

In this case, since the flange portion is made of the resin material, the inner wall surface of the housing can be suitably prevented from being damaged by the flange portion when the ferrule is inserted into the housing.

(10) An optical splice structure according to the present disclosure includes: the optical connector according to any one of items (1) to (9); an optical component that faces the optical connector and is optically spliced to the optical connector; a sleeve that optically splices the optical fiber of the optical connector and an optical fiber of the optical component; and an adapter that engages with the optical connector and the optical component.

According to the above configuration, since the inner wall surface of the housing prevents the rotation of the flange portion with respect to the housing, it is possible to reliably achieve the optical splice between the optical fiber of the optical connector and the optical fiber of the optical component (for example, another optical connector). In particular, positioning of the two optical fibers in three axial directions is achieved by the sleeve, and the azimuthal positioning of the optical fiber of the optical connector around the central axis is achieved by the inner wall surface of the housing. Thus, it is possible to reliably reduce a splice loss between the two optical fibers.

Advantageous Effects of Present Disclosure

According to the present disclosure, it is possible to provide an optical connector capable of achieving azimuthal positioning of a ferrule around a central axis with respect to a housing by a relatively simple structure without increasing the number of components of the optical connector. Further, an optical splice structure including the optical connector can be provided.

Details of Embodiments

Hereinafter, embodiments of the present disclosure will be described with reference to the drawings. Ratios of dimensions of respective members illustrated in the drawings may be different from actual ratios of the dimensions of the respective members for convenience of description. Further, in the present disclosure, an X-axis direction, a Y-axis direction, and a Z-axis direction set for an optical connector 1 shown in FIG. 1 will be referred to as appropriate. Each of the X-axis direction, the Y-axis direction, and the Z-axis direction is perpendicular to the remaining two directions. The X-axis direction is parallel to a longitudinal direction of a front housing 4 of the optical connector 1.

FIG. 1 is a perspective view showing the optical connector 1 according to an embodiment of the present disclosure. The optical connector 1 includes an optical fiber 2, ferrule 3, the front housing 4, a latch 6, a rear housing 5, a clip 7, and a boot 8.

Figure 2:
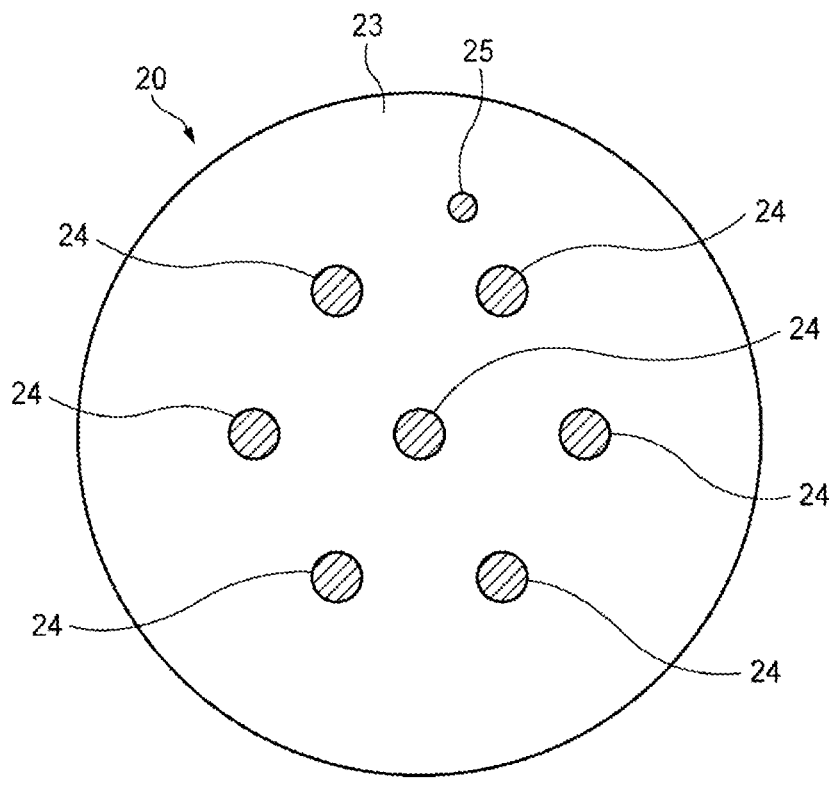
FIG. 2 is a view showing a cross section of a glass fiber in the optical connector of FIG. 1.

FIG. 2 is a view showing a cross section perpendicular to a longitudinal direction of the glass fiber 20 in the optical connector 1. The optical fiber 2 includes the glass fiber 20 and a resin coating 21 covering the glass fiber 20. The glass fiber 20 has a structure that is not axis-symmetric with respect to a central axis (not shown) extending in the longitudinal direction in the cross section perpendicular to the longitudinal direction. In the present embodiment, a multi-core fiber is used as an example of the optical fiber 2 having a structure that is not axis-symmetric with respect to a central axis.

The glass fiber 20 includes a plurality of cores 24 through which signal light propagates, a marker 25, and a cladding 23 covering the plurality of cores 24 and the marker A refractive index of each of the cores 24 is larger than a refractive index of the cladding 23, A refractive index of the marker 25 is different from the refractive index of the cladding 23. The marker 25 is used for distinguishing the cores 24 from one another when an azimuth of the optical fiber 2 around the central axis is adjusted (rotationally aligned). In the optical fiber 2, an end portion of the glass fiber 20 is exposed from the resin coating 21.

Figure 3:
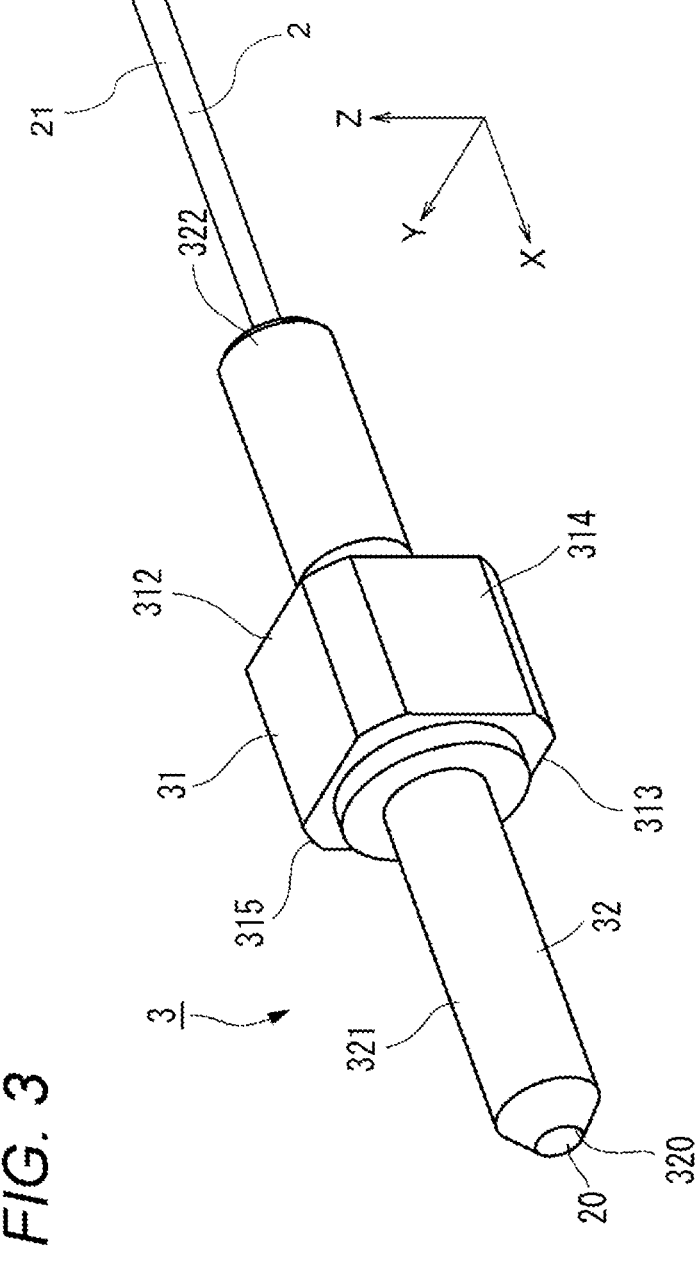
FIG. 3 is a perspective view showing a state in which an optical fiber is attached to a ferrule in the optical connector of FIG. 1.

FIG. 3 is a perspective view showing a state in which the optical fiber 2 is attached to the ferrule 3 in the optical connector 1. The ferrule 3 includes a ferrule main body 32 that accommodates and supports the glass fiber 20 exposed from the resin coating 21, and a flange portion 31 fixed to the ferrule main body 32.

The ferrule main body 32 may be formed of, for example, a metal material such as zirconia. The ferrule main body 32 has a cylindrical shape extending in the X-axis direction. The ferrule main body 32 has a through hole 320 extending in the X-axis direction. The glass fiber 20 is inserted into the through hole 320. The ferrule main body 32 includes a front portion 321 protruding forward from the flange portion 31 in the X-axis direction and a rear portion 322 protruding rearward from the flange portion 31 in the X-axis direction. The glass fiber 20 is inserted from the rear portion 322 toward the front portion 321, In a state in which the glass fiber 20 is held in the through hole 320, an end surface of the glass fiber 20 is exposed from the through hole 320.

In a state in which the glass fiber 20 is accommodated in the ferrule main body 32, the optical fiber 2 is fixed to the ferrule 3, and the azimuth of the optical fiber 2 around the central axis is adjusted. That is, after the glass fiber 20 is accommodated in the ferrule main body 32, a position of the core 24 around the central axis of the optical fiber 2 is determined through a rotational alignment process of the optical fiber 2, In this way, the optical fiber 2 is positioned with respect to the ferrule 3.

The flange portion 31 may be formed of a resin material or a metal material. A cross-sectional shape of the flange portion 31 perpendicular to the X-axis direction is substantially rectangular. The flange portion 31 includes an upper surface 312 (an example of a first surface), a lower surface 313 (an example of a second surface), a first side surface 314, and a second side surface 315. The lower surface 313 is located opposite to the upper surface 312 across the central axis of the ferrule main body 32 in the Z-axis direction. The first side surface 314 is located between the upper surface 312 and the lower surface 313 in the Z-axis direction. The second side surface 315 is located between the upper surface 312 and the lower surface 313 in the Z-axis direction, and is located opposite to the first side surface 314 across the central axis of the ferrule main body 32 in the Y-axis direction. In the present embodiment, each of the upper surface 312, the lower surface 313, the first side surface 314, and the second side surface 315 of the flange portion 31 is a flat surface.

Figure 4:
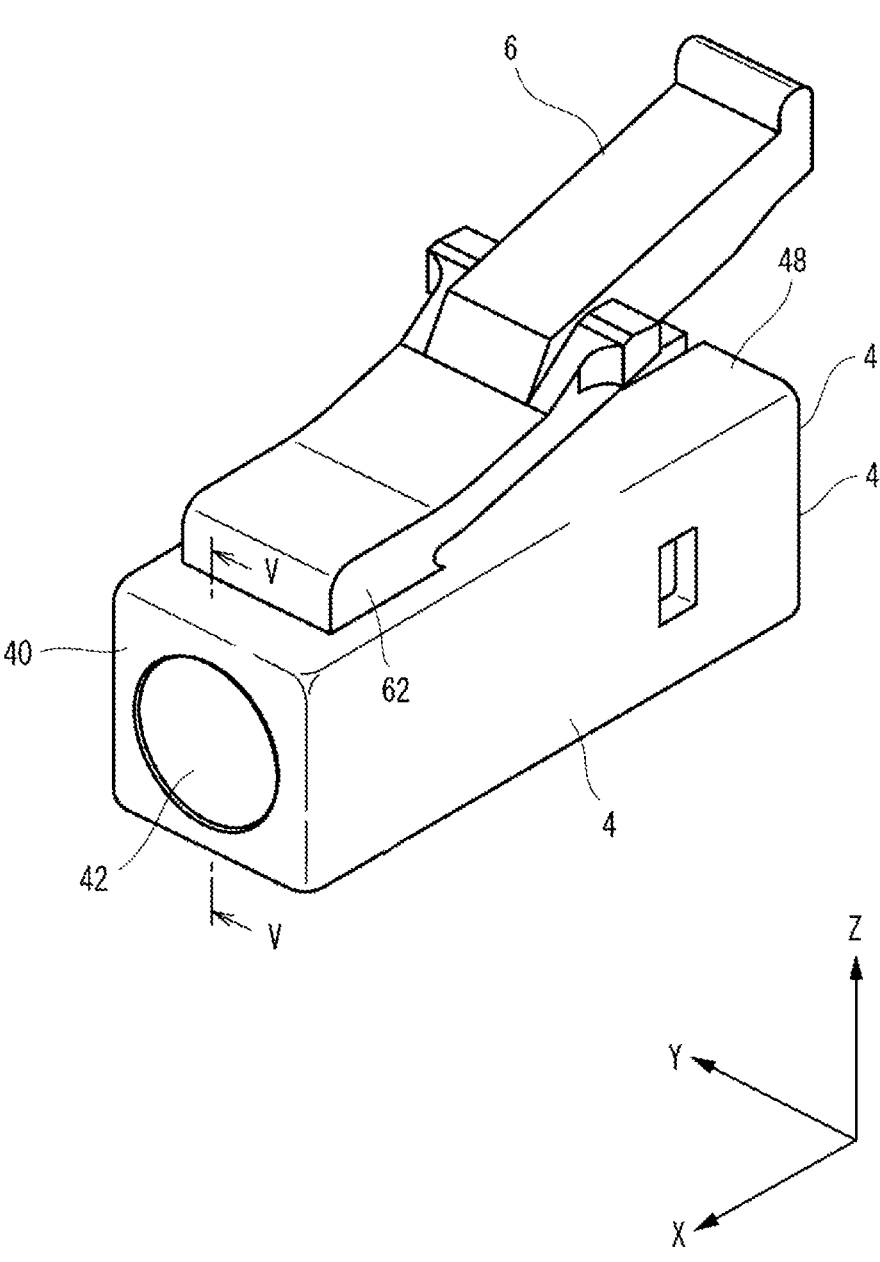
FIG. 4 is a perspective view showing a front housing and a latch in the optical connector of FIG. 1.

FIG. 4 is a perspective view showing the front housing 4 and the latch 6 in the optical connector. The front housing 4 (an example of a housing) extends in the X-axis direction and accommodates the ferrule 3 and a spring 12 (an example of an elastic member). The front housing 4 is formed of, for example, a resin material. The front housing 4 has a front opening 42 in a front surface 40 and a rear opening 43 in a rear surface 41.

Figure 5:
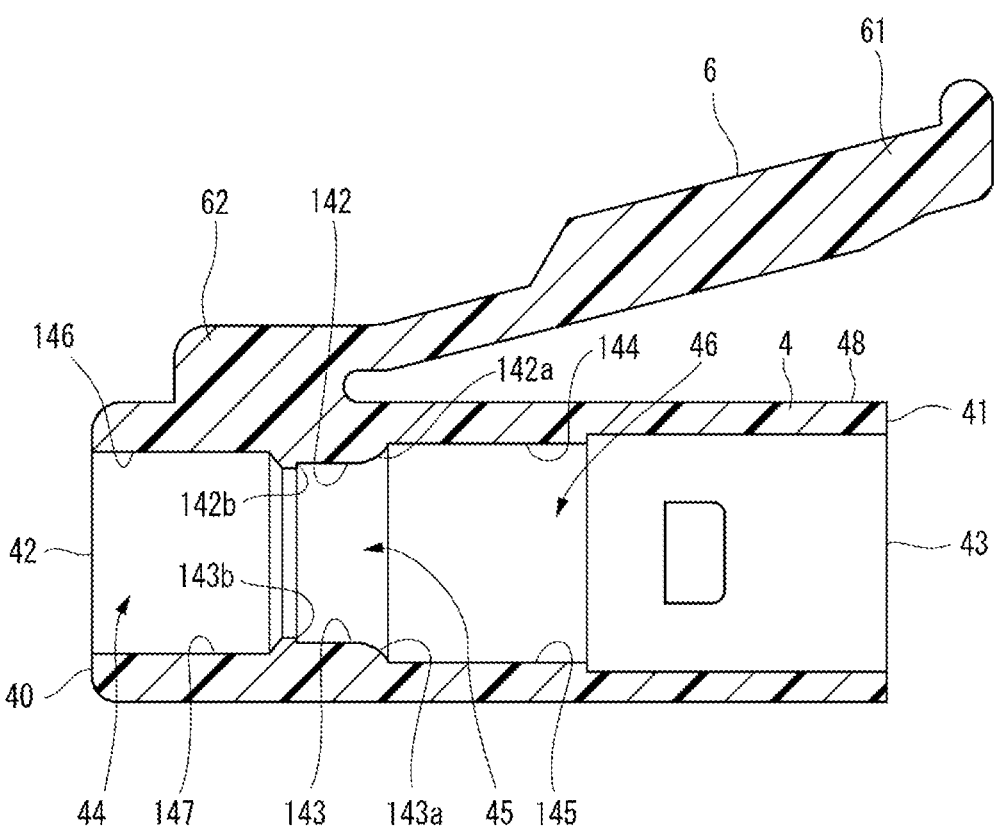
FIG. 5 is a cross-sectional view of the front housing taken along a line V-V in FIG. 4.
Figure 5:
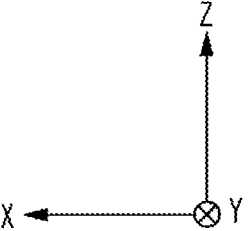

FIG. 5 is a cross-sectional view of the front housing 4 taken along a line V-V shown in FIG. 4. The front housing 4 includes a front accommodating portion 44 connected to the front opening 42 and defined by an upper inner wall surface 146 and a lower inner wall surface 147 facing each other in the Z-axis direction, a rear accommodating portion 46 connected to the rear opening 43 and defined by an upper inner wall surface 144 and a lower inner wall surface 145 facing each other in the Z-axis direction, and an intermediate accommodating portion 45 located between the front accommodating portion 44 and the rear accommodating portion 46 and defined by an upper inner wall surface 142 (an example of a first inner wall surface) and a lower inner wall surface 143 (an example of a second inner wall surface).

The upper inner wall surface 142 is located between the upper inner wall surface 146 and the upper inner wall surface 144 in the X-axis direction. The lower inner wall surface 143 is located between the lower inner wall surface 147 and the lower inner wall surface 145 in the X-axis direction. A distance between the upper inner wall surface 142 and the lower inner wall surface 143 in the Z-axis direction is smaller than a distance between the upper inner wall surface 146 and the lower inner wall surface 147 in the Z-axis direction, and is also smaller than a distance between the upper inner wall surface 144 and the lower inner wall surface 145 in the Z-axis direction. The front accommodating portion 44 and the intermediate accommodating portion 45 communicate with each other, and the intermediate accommodating portion 45 and the rear accommodating portion 46 communicate with each other.

The front portion 321 of the ferrule main body 32 is accommodated in the front accommodating portion 44, The rear portion 322 of the ferrule main body 32 is accommodated in the rear accommodating portion 46. The flange portion 31 of the ferrule 3 is accommodated in the intermediate accommodating portion 45.

The upper inner wall surface 142 includes an upper tapered inner wall surface 142*a* and an upper locking surface 142*b*, The lower inner wall surface 143 includes a lower tapered inner wall surface 143*a* and a lower locking surface 143*b*. A distance between the upper tapered inner wall surface 142*a* and the lower tapered inner wall surface 143*a* in the Z-axis direction gradually increases toward the rear accommodating portion 46. In this way, the flange portion 31 can be smoothly guided into the intermediate accommodating portion 45 by the upper tapered inner wall surface 142*a* and the lower tapered inner wall surface 143*a*.

Figure 6:
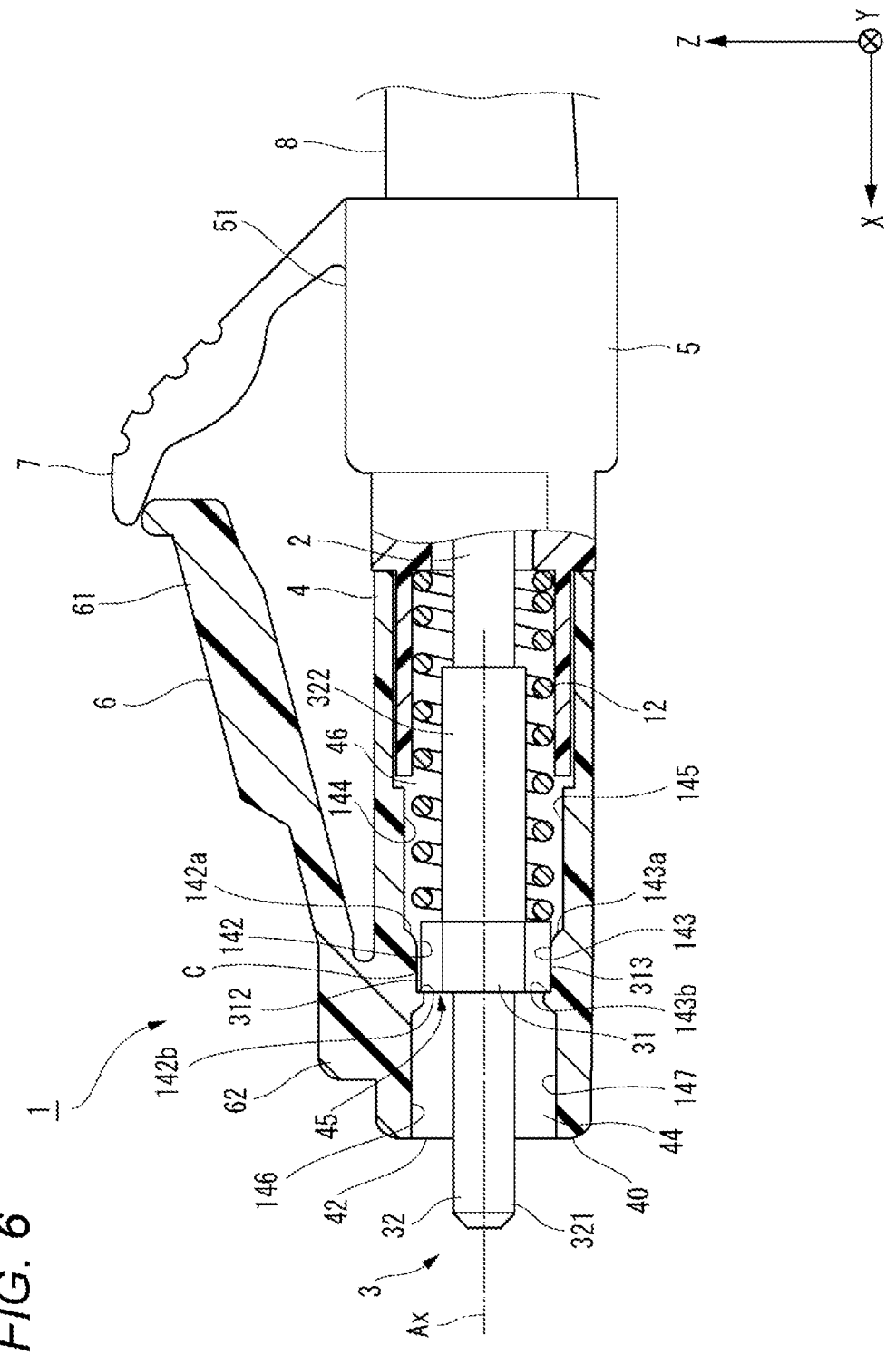
FIG. 6 is a cross-sectional view showing the optical connector in FIG. 1 before the optical connector is engaged with an adapter.
Figure 7:
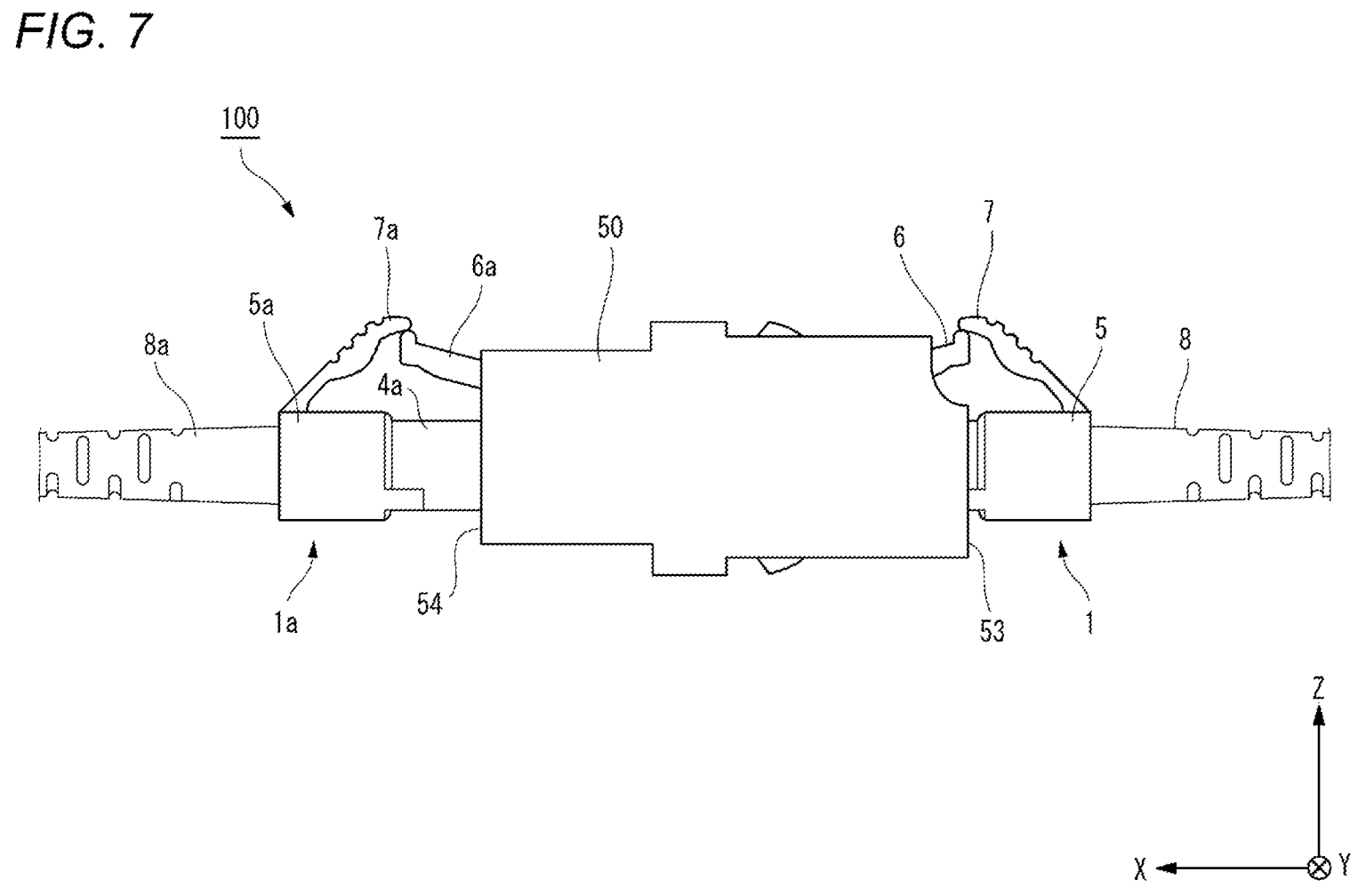

FIG. 6 is a cross-sectional view showing the front housing 4 in a state before the optical connector 1 is engaged with an adapter 50 (see FIG. 7). The spring 12 is accommodated in the front housing 4 as the example of the elastic member. The spring 12 applies an elastic force to the ferrule 3 in the X-axis direction which is the longitudinal direction of front housing 4. Specifically, the spring 12 applies the elastic force to the flange portion 31 in a +X-axis direction. On the other hand, since the flange portion 31 abuts on the upper locking surface 142*b* and the lower locking surface 143*b*, the flange portion 31 is stationary in the intermediate accommodating portion 45. That is, since a normal force generated by the upper locking surface 142*b* and the lower locking surface 143*b* is balanced with the elastic force of the spring 12, the flange portion 31 is stationary at a predetermined position in a state of abutting on the upper locking surface 142*b* and the lower locking surface 143*b*.

The upper inner wall surface 142 and the lower inner wall surface 143 face each other with the flange portion 31 of the ferrule 3 interposed therebetween in the Z-axis direction. The upper inner wall surface 142 faces the upper surface 312 of the flange portion 31, and the lower inner wall surface 143 faces the lower surface 313 of the flange portion 31. Before the optical connector 1 is accommodated in the adapter 50 shown in FIG. 7, a space C (clearance) is provided between the upper inner wall surface 142 and the upper surface 312, while the lower inner wall surface 143 and the lower surface 313 are in contact with each other. A dimension of the space C in the Z-axis direction is, for example, 100 μm or less. In the present embodiment, the upper inner wall surface 142 and the lower inner wall surface 143 regulate rotation of the flange portion 31.

The latch 6 is provided on an upper surface 48 of the front housing 4. The latch 6 is fixed to the front housing 4. In this regard, the latch 6 may be formed integrally with the front housing 4. The rear housing 5 is engaged with the front housing 4, and is located between the front housing 4 and the boot 8 in the X-axis direction. The rear housing 5 is formed of, for example, a resin material.

The clip 7 is provided on an upper surface 51 of the rear housing 5. The clip 7 may be formed integrally with the rear housing 5. In a state in which the rear housing 5 is engaged with the front housing 4, the clip 7 is engaged with the latch 6.

(Optical Splice Structure 100)

Figure 8:
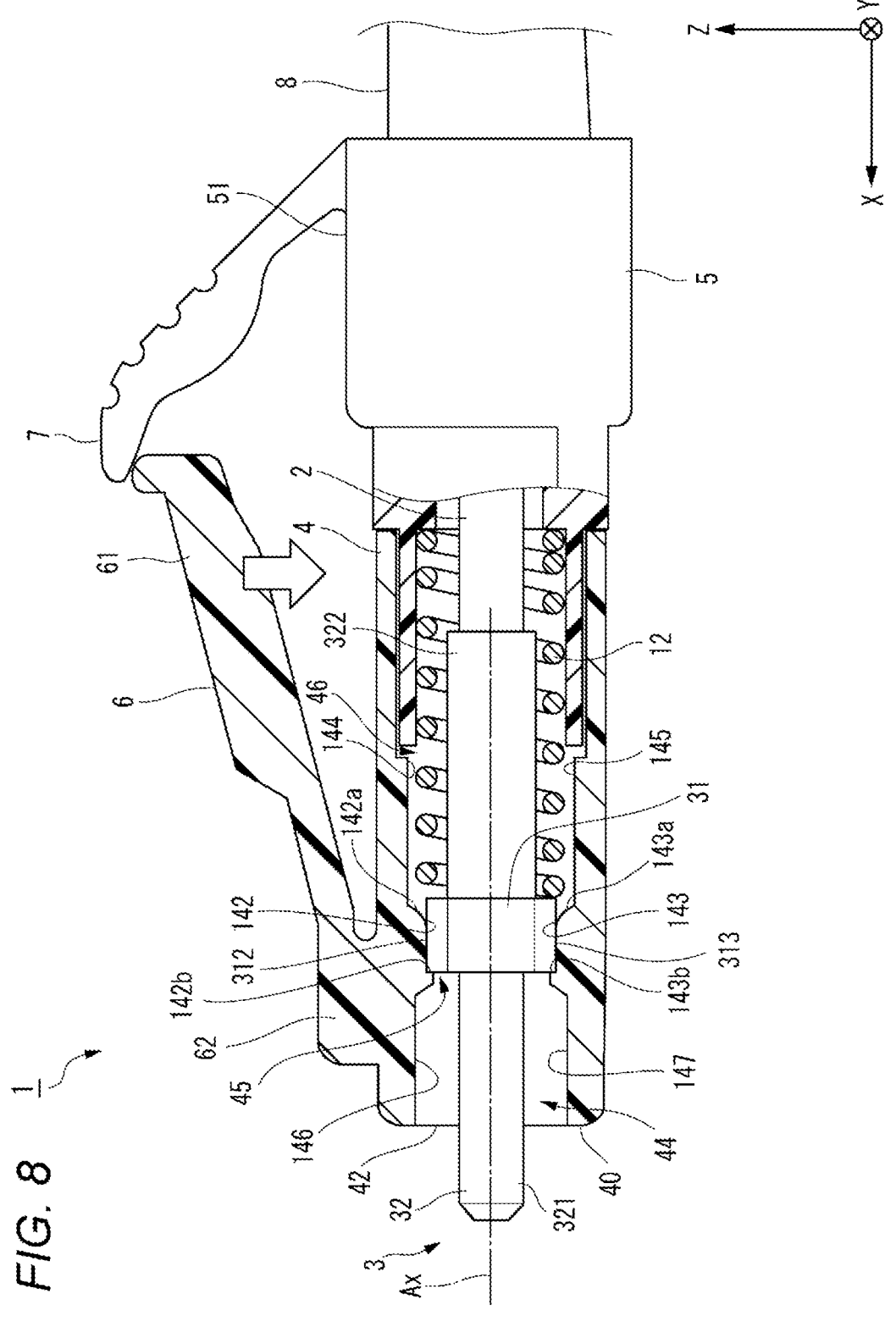
FIG. 8 is a cross-sectional view showing the optical connector in a state after the optical connector is engaged with the adapter and before the optical connector is optically spliced to a mating optical connector.
Figure 9:
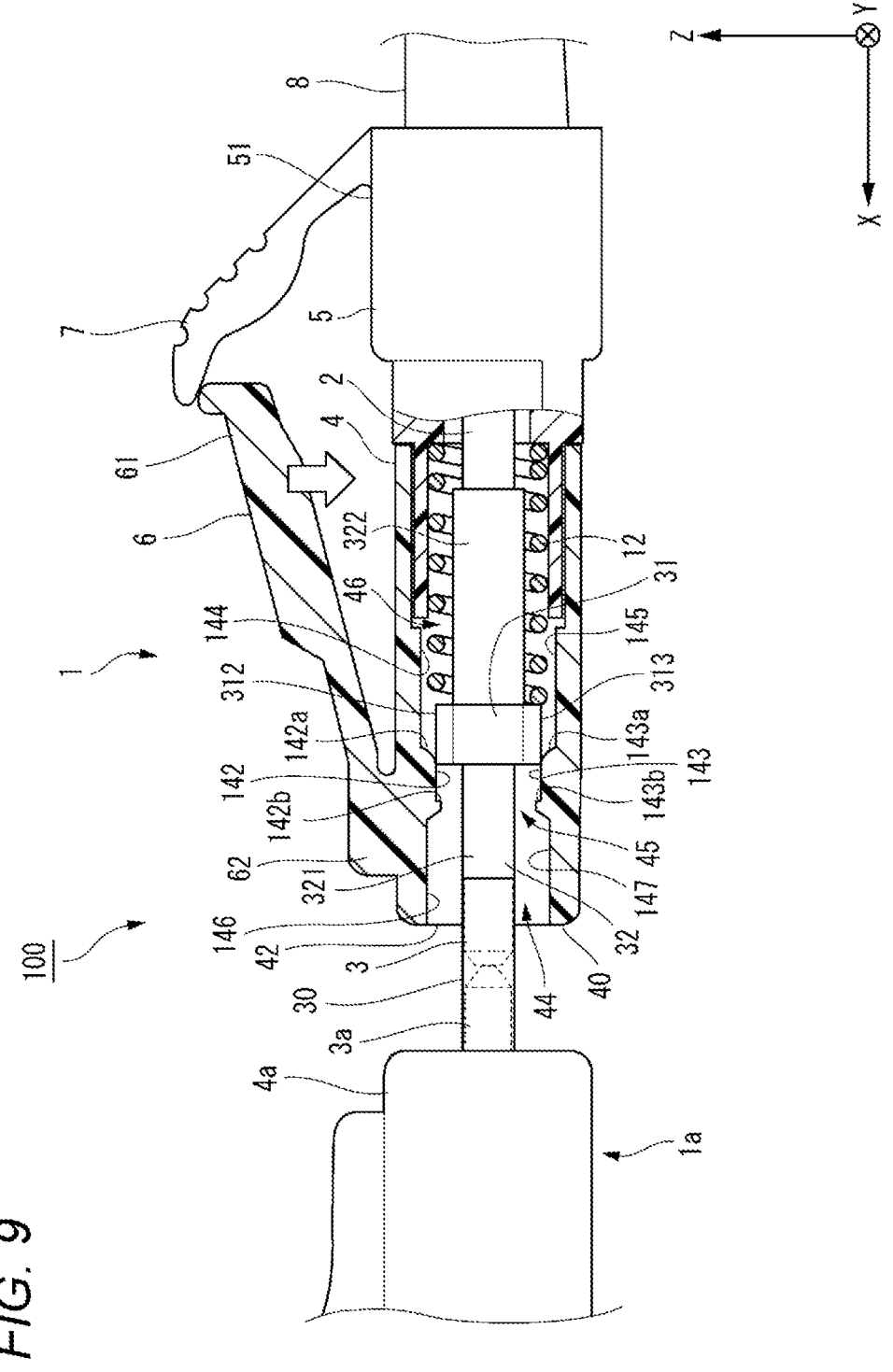
FIG. 9 is a view showing a state in which the ferrule is in a floating state with respect to the front housing.

Next, an optical splice structure 100 will be described below with reference to FIGS. 7 to 9. FIG. 7 is a view showing a state in which optical connectors 1 and 1*a* optically spliced to each other are engaged with the adapter 50. FIG. 8 is a cross-sectional view showing the optical connector 1 in a state after the optical connector 1 is engaged with the adapter 50 and before the optical connector 1 is optically spliced to the optical connector 1*a*. FIG. 9 is a view showing a state in which the ferrule 3 is in a floating state with respect to the front housing 4. It is noted that the adapter 50 is not shown in FIGS. 8 and 9.

In the present embodiment, the optical connector 1 and the optical connector 1*a* (an example of an optical component) are optically spliced to each other through the adapter 50. The optical connector 1*a* has the same configuration as the optical connector 1 according to the present embodiment.

As shown in FIGS. 7 and 9, the optical splice structure 100 includes the optical connector 1, the optical connector 1*a*, a sleeve 30, and the adapter 50. The optical connector 1*a* faces the optical connector 1 in the X-axis direction and is optically spliced to the optical connector 1. The optical connector 1*a* includes an optical fiber (not shown) extending in the X-axis direction, a ferrule 3*a*, a front housing 4*a*, a latch 6*a*, a rear housing 5*a*, a clip 7*a*, and a boot 8*a*.

The sleeve 30 is a split sleeve in which a slit extending in the X-axis direction is formed. The front portion 321 of the ferrule 3 is inserted into the sleeve 30 from one end side of the sleeve 30, and a front portion of the ferrule 3*a* is inserted into the sleeve 30 from the other end side of the sleeve 30. The sleeve 30 optically splices the optical fiber 2 of the optical connector 1 and the optical fiber of the optical connector 1*a*.

The adapter 50 engages with the optical connector 1 and the optical connector 1*a*. As shown in FIG. 7, the optical connector 1 is inserted into the adapter 50 from one end side 53 of the adapter 50, while the optical connector 1*a* is inserted into the adapter 50 from the other end side 54 of the adapter 50. The front housing 4 of the optical connector 1 is accommodated in the adapter 50 while the optical connector 1 is engaged with the adapter 50. Similarly, the front housing 4*a* of the optical connector 1*a* is accommodated in the adapter 50 while the optical connector 1*a* is engaged with the adapter 50.

When the optical connector 1 engages with the adapter 50, the latch 6 engages with a part of the adapter 50. As a result, as shown in FIG. 8, the latch 6 is deformed in a −Z-axis direction. In this case, at least a part of the front housing 4 is deformed as the latch 6 is deformed in the −Z-axis direction, Specifically, as a distal end portion 61 of the latch 6 deforms in the −Z-axis direction, the upper inner wall surface 142 connected to a proximal end portion 62 of the latch 6 deforms in the Z-axis direction. In particular, since a force is applied to the upper inner wall surface 142 as the latch 6 is deformed in the −Z-axis direction, the upper inner wall surface 142 moves slightly in the −Z-axis direction. As a result, the space C formed between the upper inner wall surface 142 and the upper surface 312 of the flange portion 31 is eliminated, and the upper inner wall surface 142 and the upper surface 312 come into contact with each other.

Thus, the rotation of the flange portion 31 with respect to the front housing 4 is prevented through surface contact between the upper inner wall surface 142 and the upper surface 312 of the flange portion 31 and surface contact between the lower inner wall surface 143 and the lower surface 313 of the flange portion 31. In particular, through the surface contact, it is possible to prevent the flange portion 31 from rotating about a central axis Ax of the flange portion 31 with respect to the front housing 4.

Since the rotation of the flange portion 31 with respect to the front housing 4 is prevented, the azimuth of the optical fiber 2 fixed to the ferrule main body 32 around the central axis is similarly fixed. Therefore, when the front portion 321 of the ferrule main body 32 is accommodated in the sleeve 30, it is possible to suitably prevent a situation in which the azimuth of the optical fiber 2. (position of the core 24) around the central axis is changed as the ferrule 3 rotates. In this way, it is possible to suitably prevent a situation in which a splice loss between the optical connector 1 and the optical connector 1a increases due to the change in azimuth of the optical fiber 2 around the central axis, and it is possible to provide the optical splice structure 100 have an improved optical characteristic.

As shown in FIG. 9, when the optical fiber 2 of the optical connector 1 is optically spliced to the optical fiber of the optical connector 1a, the ferrule 3 moves in the −X-axis direction against the elastic force of the spring 12. As a result, since the flange portion 31 located in the intermediate accommodating portion 45 moves to the rear accommodating portion 46, the prevention of the rotation of the flange portion 31 by the upper inner wall surface 142 and the lower inner wall surface 143 is released. Further, the ferrule 3 is in the floating state with respect to the front housing 4. In other words, the ferrule 3 is movable in the X-axis direction, the Y-axis direction, and the Z-axis direction with respect to the front housing 4.

As described above, in the state in which the optical fiber 2 of the optical connector 1 is optically spliced to the optical fiber of the optical connector 1a, even when the front housing 4 receives an external impact, it is possible to suitably prevent an optical splice between the optical fiber 2 and the optical fiber of the optical connector 1a from being adversely affected.

According to the present embodiment, it is possible to provide the optical connector 1 capable of achieving the azimuthal positioning of the ferrule 3 around the central axis with respect to the front housing 4 by a relatively simple structure without increasing the number of components of the optical connector 1. Before the optical connector 1 is inserted into the adapter the space C is formed between the upper inner wall surface 142 and the upper surface 312 of the flange portion 31. Therefore, since it is not necessary to process the front housing 4 with strict accuracy, a manufacturing cost of the optical connector 1 can be reduced. Further, due to the space C, when the ferrule 3 is inserted into the front housing 4, the upper inner wall surface 142 can be suitably prevented from being damaged by the flange portion 31.

According to the present embodiment, since the upper surface 312 and the lower surface 313 of the flange portion 31 are formed as the flat surfaces, it is possible to reliably achieve the azimuthal positioning of the ferrule 3 around the central axis Ax of the ferrule 3 with respect to the front housing 4 through the surface contact between the upper inner wall surface 142 and the upper surface 312 and the surface contact between the lower inner wall surface 143 and the lower surface 313.

When the flange portion 31 is made of the metal material, the upper inner wall surface 142 and the upper surface 312 of the flange portion reliably come into surface contact with each other, and the lower inner wall surface 143 and the lower surface 313 of the flange portion 31 reliably come into surface contact with each other. In this way, through the surface contact between the upper inner wall surface 142 and the upper surface 312 and the surface contact between the lower inner wall surface 143 and the lower surface 313, it is possible to reliably achieve the azimuthal positioning of the ferrule 3 around the central axis with respect to the front housing 4.

On the other hand, in a case in which the flange portion 31 is made of the resin material, the upper inner wall surface 142 and the lower inner wall surface 143 are suitably prevented from being damaged by the flange portion 31 when the ferrule 3 is accommodated inside the front housing 4.

In the present embodiment, since the front housing 4 is made of a resin material, at least a part (upper inner wall surface 142) of the front housing 4 is easily deformed as the latch 6 is deformed in the −Z-axis direction.

Although the embodiments have been described above, it goes without saying that the technical scope of the present invention should not be construed as being limited by the description of the embodiments. It is to be understood by, those skilled in the art that the embodiments are merely examples, and various modifications can be made within the scope of the inventions described in the claims. As described above, the technical scope of the present invention should be determined based on the scope of the inventions described in the claims and an equivalent scope thereof.

For example, in the present embodiment, the optical fiber 2 may be a polarization maintaining fiber or a bundle fiber. The polarization maintaining fiber includes a pair of stress applying portions, a core disposed between the pair of stress applying portions and through which signal light propagates, and a cladding covering the pair of stress applying portions and the core. When the polarization maintaining fiber is used as the optical fiber 2, crosstalk between the optical connector 1 and the optical connector 1a can be suitably reduced. The bundle fiber includes a bundle of single-core fibers.

In the present embodiment, the cross-sectional shape of the flange portion 31 perpendicular to the X-axis direction is not particularly limited. For example, the cross-sectional shape of the flange portion 31 may be a triangular shape or a D-shape. Even if the cross-sectional shape of the flange portion 31 is the triangular shape or the D-shape, the prevention of the rotation of the flange portion 31 can be achieved through the contact between the upper inner wall surface 142 and the flange portion 31.

Further, the optical connector 1 is not necessarily provided with the latch 6, For example, the front housing 4 and the adapter 50 may be designed such that the upper inner wall surface 142 is deformed when the front housing 4 is accommodated in the adapter 50. For example, by devising a dimension of an accommodating portion of the adapter 50 in which the front housing 4 is accommodated, the upper inner wall surface 142 can be deformed when the front housing 4 is accommodated in the adapter 50.

REFERENCE SIGNS LIST 1, 1a optical connector
2 optical fiber
3, 3a ferrule
4, 4a front housing
5a rear housing
6, 6a latch
7, 7a clip
8, 8a boot
12 spring
20 glass fiber
21 resin coating
23 cladding
24 core
25 marker
30 sleeve
31 flange portion

32 ferrule main body
44 front accommodating portion
45 intermediate accommodating portion
46 rear accommodating portion
50 adapter
61 distal end portion
62 proximal end portion
100 optical splice structure
142 upper inner wall surface
142a upper tapered inner wall surface
142b upper locking surface
143 lower inner wall surface
143a lower tapered inner wall surface
143b lower locking surface
144 upper inner wall surface
145 lower inner wall surface
146 upper inner wall surface
147 lower inner wall surface
312 upper surface
313 lower surface
314 first side surface
315 second side surface
320 through hole
321 front portion
322 rear portion

The invention claimed is:

1. An optical connector that is configured to be engaged with an adaptor for fiber optical splicing, comprising:

an optical fiber that includes a glass fiber including a core and a cladding covering the core, and a resin coating portion covering the glass fiber, an end portion of the glass fiber being exposed from the resin coating portion;

a ferrule that includes a ferrule main body holding the glass fiber exposed from the resin coating portion and a flange portion fixed to the ferrule main body;

a housing that accommodates the ferrule and includes an inner wall surface facing the ferrule;

an elastic member that is accommodated in the housing and applies an elastic force to the ferrule in a longitudinal direction of the housing; and a latch fixed to the housing, wherein the housing is configured to have a space between the inner wall surface and the flange portion, the housing is configured such that at least a part of the housing including the inner wall surface is deformed in a state where the housing is engaged with the adaptor, and the inner wall surface prevents rotation of the flange portion with respect to the housing, before the housing is engaged with the adaptor, the space exists between at least one of the inner wall surfaces and a corresponding surface of the flange portion at an end of the flange portion opposite the elastic member in the longitudinal direction, and the latch is configured to deform in a direction intersecting the longitudinal direction upon engagement between the housing and the adaptor, such that deformation of the latch deforms at least a part of the housing, eliminates the space, and brings the inner wall surface into contact with the corresponding surface of the flange portion to prevent rotation of the flange portion with respect to the housing.

2. The optical connector according to claim 1, wherein the flange portion includes a flat surface facing the inner wall surface, and the flat surface is configured to contact the inner wall surface to prevent the rotation of the flange portion with respect to the housing.

3. The optical connector according to claim 1, wherein the inner wall surface includes a first inner wall surface and a second inner wall surface facing each other via the ferrule in a direction orthogonal to the longitudinal direction, the flange portion includes a first surface facing the first inner wall surface, and a second surface located opposite to the first surface and facing the second inner wall surface, and the first inner wall surface, the second inner wall surface, the first surface, and the second surface are configured to prevent the rotation of the flange portion with respect to the housing by contact between the first inner wall surface and the first surface and contact between the second inner wall surface and the second surface.

4. The optical connector according to claim 1, wherein when the optical fiber is optically spliced to an optical component, the ferrule moves in the longitudinal direction against the elastic force from the elastic member, and the prevention of the rotation of the flange portion by the inner wall surface is released, and the ferrule is in a floating state with respect to the housing.

5. The optical connector according to claim 1, wherein the optical fiber is a multi-core fiber, a polarization maintaining fiber, or a bundle fiber.

6. The optical connector according to claim 1, wherein the housing is made of a resin material.

7. The optical connector according to claim 1, wherein the flange portion is made of a metal material.

8. The optical connector according to claim 1, wherein the flange portion is made of a resin material.

9. An optical splice structure comprising:

the optical connector according to claim 1;

an optical component that faces the optical connector and is optically spliced to the optical connector;

a sleeve that optically splices the optical fiber of the optical connector and an optical fiber of the optical component; and the adaptor that engages with the optical connector and the optical component.

* * * * *